(12) United States Patent
Shiue et al.

(10) Patent No.: US 6,678,147 B2
(45) Date of Patent: Jan. 13, 2004

(54) ELECTROCHEMICAL CAPACITOR WITH ELECTRODE MATERIAL FOR ENERGY STORAGE

(75) Inventors: Lih-Ren Shiue, Hsinchu (TW); Nae-Lih Wu, Taipei (TW); Dien-Shi Wu, Chungli (TW); Chieng-Wen Chao, Chang-Hua Hsien (TW); Yi-Ping Lan, Tau-Yuan (TW)

(73) Assignee: Luxon Energy Devices Corporation, Hsinchu (TW)

( * ) Notice: Subject to any disclaimer, the term of this patent is extended or adjusted under 35 U.S.C. 154(b) by 0 days.

(21) Appl. No.: 10/204,369
(22) PCT Filed: Jan. 9, 2001
(86) PCT No.: PCT/US01/00756
§ 371 (c)(1),
(2), (4) Date: Aug. 19, 2002
(87) PCT Pub. No.: WO02/056325
PCT Pub. Date: Jul. 18, 2002

(65) Prior Publication Data
US 2003/0011965 A1 Jan. 16, 2003

(51) Int. Cl.$^7$ ................................. H01G 9/00
(52) U.S. Cl. .................. 361/502; 361/503; 361/504; 361/508; 361/512

(58) Field of Search ................. 361/502, 503, 361/504, 508, 512, 516, 523, 525, 528, 509; 29/25.03; 252/62.2

(56) References Cited

U.S. PATENT DOCUMENTS

| 5,872,698 A | 2/1999 | Bai et al. |
| 5,963,417 A | 10/1999 | Anderson et al. |
| 6,094,338 A | 7/2000 | Hirahara et al. |

*Primary Examiner*—Dean A. Reichard
*Assistant Examiner*—Nguyen T. Ha

(57) ABSTRACT

Iron oxide film directly grown on iron, steel, or other substrates by chemical or electrochemical oxidation is a promising material for energy storage through surface adsorption of static charges. As the electrode materials of energy-storage devices, the hydrated iron compound has a chemical composition of $Fe_xO_yH_z$, where $1.0 \leq x \leq 3.0$, $0.0 \leq y \leq 4.0$, and $0.0 \leq z \leq 1.0$. An aqueous or organic solution of a metallic salt including sulfates, sulfites, hydroxides, chlorides, phosphates and nitrates is used as electrolyte for the electrochemical devices. Cyclic voltammetry indicates that the iron-oxide electrodes in the electrolytes can store charges as high as 0.5 F/cm$^2$ or 320 F/g of the electrode materials. Electrochemical capacitors using the iron oxide as the electrode material is an economical and viable power source for use in portable electronics, power tools, and electrical vehicles.

6 Claims, 4 Drawing Sheets

ELECTROCHEMICAL CAPACITOR WITH ELECTRODE MATERIAL FOR ENERGY STORAGE

FIELD OF THE INVENTION

The present invention relates to an energy storage device that can enhance the performances of batteries in numerous applications. More specifically, the present invention relates to an iron oxide compound used as the electrode material for supercapacitors.

BACKGROUND OF THE INVENTION

Supercapacitor is also known as ultracapacitor or electric double layer capacitor. In rigid terms, though there is some distinction among them, they all can store a large quantity of charges up to several thousands farad (F) in compact sizes. Furthermore, they all have high power density (>1 KW/Kg), high charge-discharge life (>$10^4$ cycles), and high discharge efficiency (>90%). The high power density of supercapacitor derives from its quick-discharge characteristics in conjunction with large capacity of energy-storage. Such high power density imparts supercapacitors and the like a unique role as the peak-current provider in hand-held electronic devices, portable power tools electrical vehicles (EVs) and automatic actuators.

All primary and secondary batteries are generally used to deliver small currents for lengthy times. This is due to the energy storage of batteries involves bulk oxidation-reduction which is thermodynamically controlled. Some batteries, such as lead-acid batteries, are capable of discharging quickly, delivering an instant large current greater than 100A in applications like the ignition of automobiles. Nevertheless, the batteries can only provide such large output at very short periods and infrequent repetitions, otherwise the batteries will soon be drained or damaged. In addition to miniaturization of the consumer electronics with inevitable shrinkage of batteries, the EVs are in urgent need for reducing oil consumption and air pollution, batteries should work in parallel with supercapacitors to fulfill the power requirements that batteries alone could not offer. In the parallel connection of batteries and supercapacitors, the latter can virtually provide any peak-current required repeatedly. This allows the batteries to discharge at rated currents, and, as a consequence, the use-time and the life-time of batteries are prolonged. The aforementioned effect is called load leveling. In light of no limitation, except voltage (not to exceed the rated value), on the charging mode of device, supercapacitors are a more versatile energy-storage device than battery. Especially in the regenerative braking of EVs, supercapacitors can quickly and safely save the residual kinetic energy of EVs for later use.

The utilization of supercapacitor in the energy-management system of batteries has been validated. However, the present market prices of supercapacitors, as well as their dimensions and specifications, prevent them from general acceptance. Regardless of their merits, supercapacitors must offer an affordable price to be commercially viable. To lower the cost of supercapacitors, an inexpensive and readily made electrode material should be found. The most frequently used electrode materials for supercapacitors include activated carbons and metal oxides. Metal oxides are superior to activated carbons in energy density, conductivity and workability. Oxides of various transition metals including ruthenium, rhodium, iridium, titanium, cobalt, molybdenum, tungsten, vanadium, manganese and nickel are investigated. Ruthenium oxide ($RuO_2$), either in crystalline or amorphous state, and iridium oxide are determined to have a specific capacitance in the range of 100–750 F/g, which is equivalent to or three-time-higher than the value attainable from carbons. Ruthenium is a by-product in the extraction of platinum, hence Ru is rare and expensive. Cost-wise, $RuO_2$ is unsuitable as the electrode material for making supercapacitors for general use. Other compounds such as sulfides, hydrides and nitrides of the aforementioned metals, iron and lead sulfides, as well as molybdenum and tungsten carbides and borides have been tested as the electrode material for electrochemical capacitor. Whereas the energy-storage capability of the above materials is generally low, the cost of the starting metals or precursors for producing the minerals is considerably high, and the fabrication procedures of the metal oxides are costly as well. Clearly, it requires a more economical and easy-of-preparation electrode material than the above substances to solve the cost problem of supercapacitors for wide applications.

SUMMARY OF THE INVENTION

As discussed in greater detail below, the present invention provides the most economical material of the existing electrode materials for energy storage through surface adsorption of static charges. The primary object of the present invention is to provide supercapacitors comprising iron oxide as the active material of electrodes of the supercapacitors. Hydrated iron compounds with a chemical composition of $Fe_xO_yH_z$, where $1.0 \leq x \leq 3.0$, $0.0 \leq y \leq 4.0$, and $0.0 \leq z \leq 1.0$, can be yielded in a thin film on iron, steel, or other substrates. In conjunction with suitable electrolytes, the electrode materials show capacitance of as high as 0.5 $F/cm^2$ or 320 F/g.

Another object of the present invention is to demonstrate that the black iron (II,III) oxide or magnetite ($Fe_3O_4$) is the major component of $Fe_xO_yH_z$ to be responsible for the high energy-storage capacity of iron oxide. Other form of iron oxide such as FeO, $Fe_2O_3$ or FeO(OH) is likely present with the magnetite. Nevertheless, its presence appears to cause no adverse effects.

Yet another object of the present invention is to provide a direct growth of iron oxide film on iron, steel or other substrates. Methods of one-step preparation include chemical oxidation, electrochemical oxidation, dip-coating, and electrophoretic deposition. Among them, chemical oxidation appears to be the most convenient way. As soon as the iron-oxide film is attained, the film-coated substrates are ready to form supercapacitors. Neither binder nor additional electrode-fabricating equipment is required in the present invention. Supercapacitors of the present invention can be prepared in simple procedures and no binder is needed, the present invention can further reduce the preparation cost of supercapacitors.

Still another object of the present invention is to provide iron oxide as the sole or partial ingredient of the electrode materials for supercapacitors. Iron oxide may be used alone, or it may mix with carbons, metal powders or mineral particles to form a composite electrode for supercapacitors. Iron-oxide film may also be formed on a porous support such as Sb-doped $SnO_2$. The aforementioned combinations utilize the low-cost iron oxide to prepare affordable supercapacitors.

The last object of the present invention is to provide an environment-friendly material, iron oxide, for fabricating supercapacitors. Iron oxides are commonly present in numerous ores on earth. Scraps from the spent iron-oxide-electrodes of supercapacitors will cause no harm to the environments. Furthermore, the iron-oxide-electrodes are easy to regenerate and the substrates may be used repeatedly.

BRIEF DESCRIPTION OF THE DRAWINGS

The present invention is better understood when read in conjunction with the following drawings, in which.

DETAILED DESCRIPTION OF THE INVENTION

Figure 1:
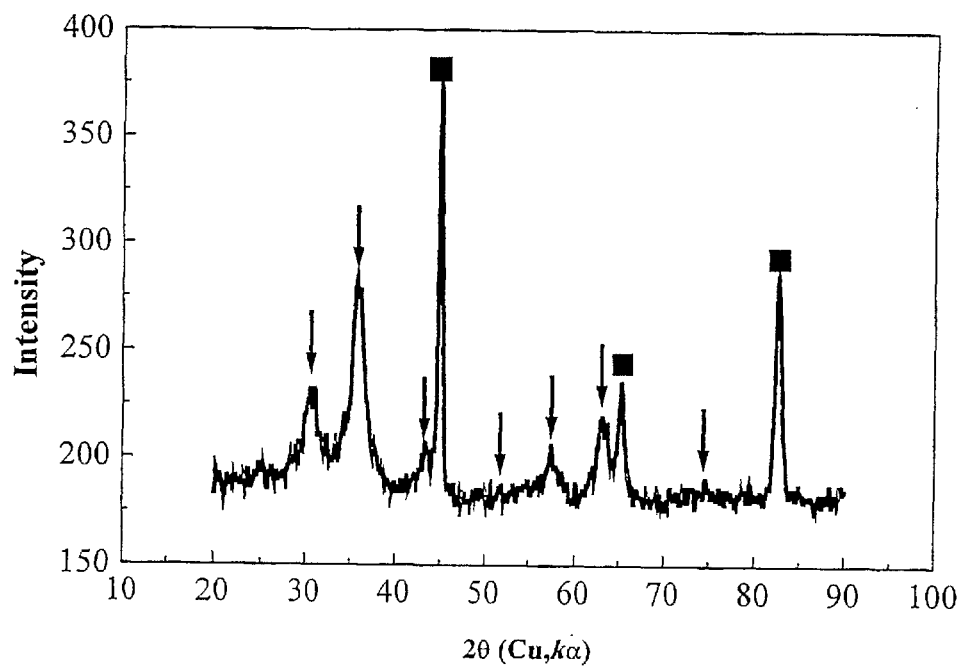
FIG. 1 is the X-ray diffraction pattern of a $Fe_3O_4$ film electrode prepared by chemically oxidizing a carbon steel substrate in a boiling solution containing 1000 g NaOH, 12 g $NaNO_3$ and 12 g $Na_2Cr_2O_7$ in 1 liter de-ionized water. The arrowed reflection are due to $Fe_3O_4$, while those marked with ■ are due to the substrate, Fe.

Depending on the electrode materials, supercapacitors may utilize two different mechanisms, double layer (DL) or surface reduction-oxidation, to store electric charges and form double layer capacitance or pseudocapacitance. A DL of opposite charges is automatically formed on the solid-liquid interface when a conductor is placed in an electrolyte solution, which blocks the diffusion of ions or species to the conductor for analysis. DL is thus minimized from the interface of solid and liquid in electrochemical analyses. However, the DL structure is deliberately maximized to store static charges to form DL capacitance in supercapacitors. There is no charge transfer in DL capacitance, yet the psudocapacitance comes from faradaic reactions involving surface or adsorbed species at the electrode-electrolyte interface. It involves faradaic charge transfer occurring at the electrode surface rather than within the bulk as in galvanic cells. Pseudocapacitance can be 10 to 100 times greater than DL capacitance. Both DL capacitance and pseudocapacitance are related to physi-sorption where charges are quickly stored and released, which are kinetic balance and it is the reason why the supercapacitors have high power density.

The energy stored in capacitors can be determined by the following formula:

$$E = \frac{1}{2} CV^2 \quad (1)$$

where E is energy in joule, C is capacitance in farad (F), and V is the working voltage of capacitor in volt. Because of the second-power of V, capacitors are normally designed to work at as high voltage as possible so that they can store more energy. Even without meticulous packaging, the bare electrodes of supercapacitors can be evaluated using cyclic voltammetry (CV). From CV graphs, useful information regarding capacitance, kinetics, stability and cycle-life of the electrodes studied can be attained. For instance, the capacitance per electrode material $C_{el}$ can be assessed by the following equation:

$$C_{el} = 2[(i_c + i_a)/2]/(dV/dt) \quad (2)$$

where $i_c$ and $i_a$ and are cathodic (reduction) and anodic (oxidation) current at 0.0 V, respectively, in Ampere, and dV/dt is the voltage scanning rate in volt/sec. Considering a cell is formed by two serially connected electrode-capacitors, a multiplication of 2 appears in equation (2).

As mentioned before, thin films of iron-oxide can be most conveniently prepared by chemical oxidation. For example, magnetite ($Fe_3O_4$) is formed rapidly in a strong alkaline solutions in the presence of an oxidizing agent such as $NaNO_3$ at temperatures above 100° C. In the reactions, $Na_2FeO_2$ and $Na_2Fe_2O_4$ are formed first, then they react with each other to form thin $Fe_3O_4$ film on iron substrate as described below:

$$3Fe + NaNO_2 + 5NaOH = 3Na_2FeO_2 + H_2O + NH_3 \quad (3)$$

$$6Na_2FeO_2 + NaNO_2 + 5H_2O = 3Na_2Fe_2O_4 + 7NaOH + NH_3 \quad (4)$$

$$Na_2FeO_2 + Na_2Fe_2O_4 + 2H_2O = Fe_3O_4 + 4NaOH \quad (5)$$

In the above reactions, iron is initially dissolved in the alkaline solution to form saturated solution of iron oxide at the solid-liquid interface. Therefrom, crystalline seeds of iron oxide are formed on some area of the iron substrates, and further growth of the seeds results in a continuous film of magnetite. As magnetite film grows from nm thickness to above 2 μm, it will change from lustrous pale-blue to dull-black color. Further oxidation of magnetite will convert the black oxide into reddish-brown iron oxide or hematite ($Fe_2O_3$). Iron oxide formed in aqueous solutions is likely in hydrous states and is best described by a chemical composition of $Fe_xO_yH_z$, where $1.0 \leq x \leq 3.0$, $0.0 \leq y \leq 4.0$, and $0.0 \leq z \leq 1.0$.

We have prepared thin black film of iron-oxide on carbon steel using chemical oxidation. When the film is subjected to X-ray diffraction (XRD) analysis, the result is shown in FIG. 1. It indicates that the film is predominantly magnetite ($Fe_3O_4$). Plates of 8 cm×8 cm $Fe_3O_4$/Fe electrodes are also used to prepare primitive supercapacitors for assessing their commercial potential. The following examples only illustrate the present invention provides a method for preparing thin iron oxide films and shows use of the thin iron oxide films for supercapacitors has promising commercial quality.

The present invention will be better understood from the following example which are merely for the purposes of illustration and by no means of any limitation therefore.

EXAMPLE 1

0.1 mm-thick carbon steel plates were cut to 2 cm×2 cm dimension, and the samples were cleaned with acid, rinsed with de-ionized water, and finally polished with sand-paper. Then the cut plates were placed in a boiling (ca 140° C.) aqueous solution containing 1 g NaOH/ml H$_2$O and 12 g KMnO$_4$/l H$_2$O. After 4 min of cooking, a uniform black film was formed on the substrates. Following the removal of plates from the solution, the substrates were rinsed and dried to yield the Fe$_3$O$_4$ electrodes. Electrodes as prepared are ready for analyses or for making supercapacitors. With addition of de-ionized water and the oxidizing agent, the same oxidizing bath can be used repeatedly. Cyclic voltammogram (CV) was used to characterize the electrodes, and a result of the analyses is shown in FIG. 2.

Figure 2:
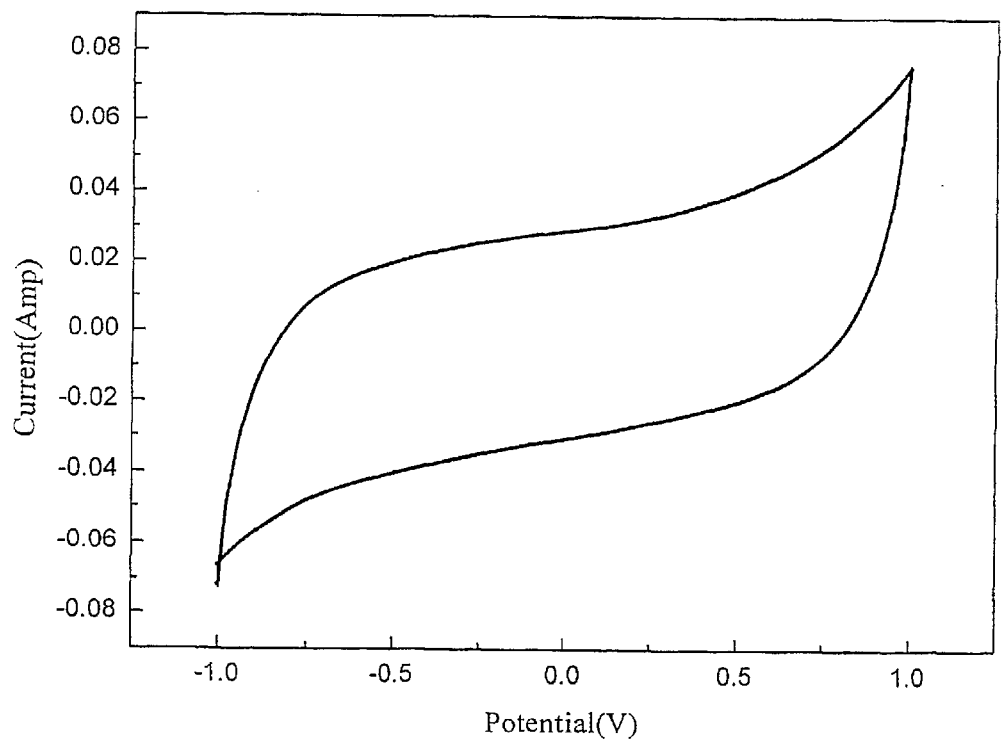
FIG. 2 is a cyclic voltammogram of two electrodes of 2 cm×2 cm $Fe_3O_4$/Fe substrate under 50 mV/sec scanning rate in 0.1M $Na_2SO_4$ and 0.5M KOH.

FIG. 2 shows the 10th CV graph of two free-standing electrodes of black Fe$_3$O$_4$ thin-film on 2 cm×2 cm iron substrate in an aqueous solution containing 0.1M Na$_2$SO$_4$ and 0.5M KOH under 50 mV/sec scanning rate. No reference electrode is used in the analysis. Except slight tilt at both ends, the CV loop is a nice rectangle, which is a typical capacitor behavior, with rapid change of current at voltage reversal. Furthermore, the voltammogram remains the same shape in many cycles of voltage scanning. This indicates that the iron oxide has good reversibility, conductivity and sorption-desorption characteristics. From FIG. 2 and equation (2), the iron oxide electrodes produced are estimated to have capacitance of 0.03 F/cm$^2$.

EXAMPLE 2

Figure 3:
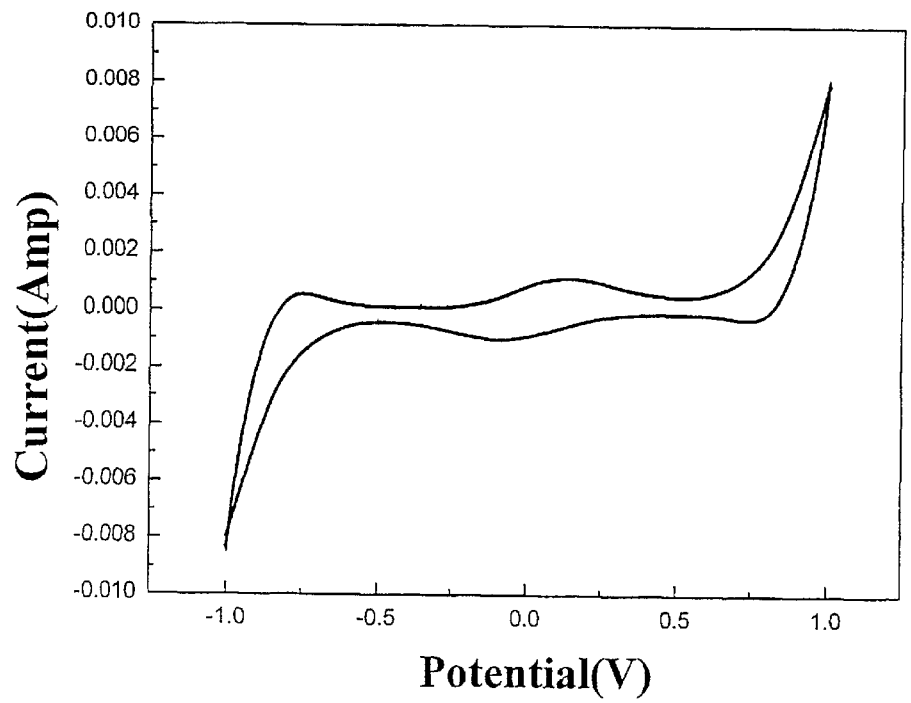
FIG. 3 is a cyclic voltammogram of two electrodes of 2 cm×2 cm $Fe_2O_3$/Fe substrate under 50 mV/sec scanning rate in 0(0.1M $Na_2SO_4$ and 0.5M KOH.

Thin Fe$_2$O$_3$/Fe electrodes were prepared according to example 1 except the cooking time is extended to 20 minutes. At that time, reddish-brown color on the substrates was also observed. Fe$_2$O$_3$/Fe electrodes were also analyzed by CV as example 1, and one of the result is shown in FIG. 3. It is clearly seen that the CV loop of Fe$_2$O$_3$ is not a normal behavior of capacitors. Thus, the capacitance of the Fe$_2$O$_3$ electrode material can not be estimated precisely. However, there is a significant difference between the capacitance of the two iron oxides, and it may be interpreted from their difference in crystal structure and conductivity.

Fe$_3$O$_4$ is an inverse spinel consisting of two oxidation states of iron, Fe(II) and Fe(III), with the less abundant Fe(II) restricted to four-fold tetrahedral sites and the more abundant Fe(III) distributed evenly between the tetrahedral sites and six-fold octahedral sites, which gives Fe$_3$O$_4$ the formula as

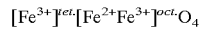

There is electron hopping between Fe(II) and Fe(III), which imparts Fe$_3$O$_4$ as a semiconductor with resistivity of 10$^{-2}$ Ω-cm. On the other hand, Fe$_2$O$_3$ is a rhomohedral oxide consisting of a hexagonal close packed oxygen array with two thirds of the octahedral interstices occupied by Fe(III). There is no movement of electron in the structure and Fe$_2$O$_3$ is an insulator with a band gap of 3.1 eV. In light of Fe$_2$O$_3$ being used as an solid adsorbent for removing hazardous gases such as nitrogen oxides and sulfur dioxide, surface area of the electrodes should not be responsible for the great capacitance difference between Fe$_3$O$_4$ and Fe$_2$O$_3$. Instead, the difference in the conductivity of the iron oxides should be the cause.

EXAMPLE 3

Figure 4:
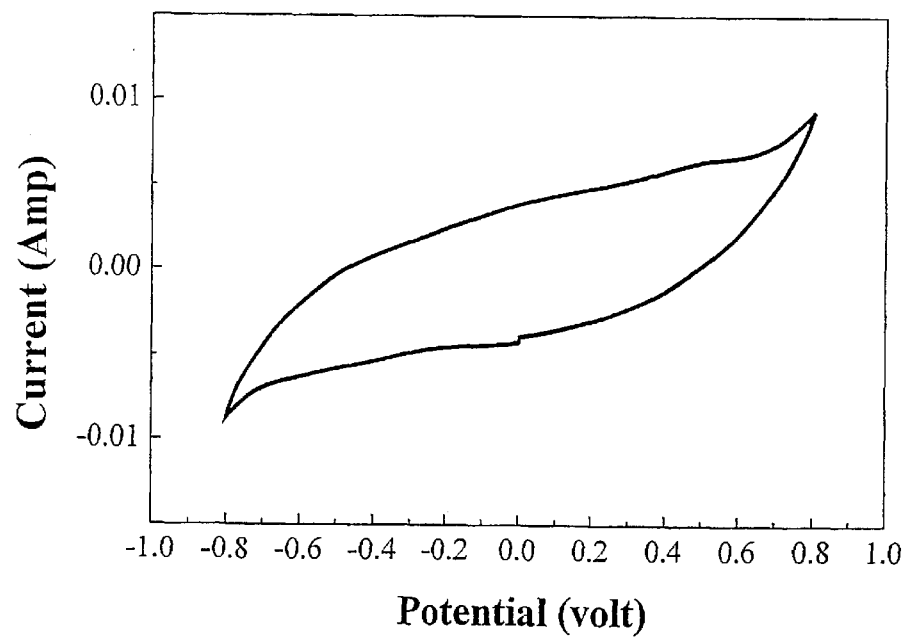
FIG. 4 is a cyclic voltammogram of $Fe_3O_4$ film electrodes in 1M $Na_2SO_4$ aqueous solution under 20 mV/sec scanning rate.

1 cm×1 cm carbon steel substrates were cooked in one liter de-ionized water containing 1000 g NaOH, 12 g NaNO$_3$ and 12 g Na$_2$Cr$_2$O$_7$ at 135–145° C. for 20 minutes to produce a 3 μm composite iron-oxide layer predominantly in Fe$_3$O$_4$. A sandwich-type cell was prepared by disposing a glass-fiber separator soaked with 1M Na$_2$SO$_4$ electrolyte between two iron-oxide electrodes. The cell was analyzed by CV using 20 mV/sec scanning rate between −0.8 volt and +0.8 volt. FIG. 4 shows the result of CV graph. By equation (2), C$_{el}$ of the electrode material studied is determined to be 0.38 F/cm$^2$. Assuming the density of the porous oxide layer is 4.0 g/cm$^3$, and using the known layer thickness of 3 μm, the above capacitance is converted to a specific capacitance of 320 F/g of the electrode material.

EXAMPLE 4

An electrochemical capacitor was built according to example 3 except that 0.5M Na$_3$PO$_4$ aqueous solution was used as the electrolyte. The capacitance of the electrode material was determined using the same procedures as example 3 and was found to be 0.08 F/cm$^2$.

EXAMPLE 5

An electrochemical capacitor was assembled according to example 3 except that iron plates were used as the substrates. As demonstrated in example 3, the cell was examined using CV and the same electrolyte except higher scanning rate of 50 mV/sec was used. The capacitance of the electrode material was determined to be 0.02 F/cm$^2$.

EXAMPLE 6

An electrochemical capacitor was made according to example 3 except that an aqueous solution containing 1M Na$_2$SO$_4$ and 0.001M KOH was used as the electrolyte. CV measurement was conducted using the same procedures as example 3, and C$_{el}$ was found to be 0.2 F/cm$^2$.

EXAMPLE 7

1 cm×1 cm iron substrates were oxidized in one liter water containing 1000 g NaOH, 12 g NaNO$_3$ under a constant anodic current of 9 mA for 3 minutes. A sandwich-type cell was prepared by disposing a glass-fiber separator soaked with 0.1M Na$_2$SO$_4$ electrolyte between two anodized electrodes. The cell was analyzed by CV using 20 mV/sec scanning rate between −0.8 volt and +0.8 volt, and C$_{el}$ was determined to be 0.05 F/cm$^2$.

EXAMPLE 8

1 cm×1 cm titanium substrates were first coated with an conductive porous Sb-doped SnO$_2$ layer. The latter was then electroplated in 1M aqueous FeSO$_4$ solution under a constant current of 195 mA for 5 minutes so that iron was deposited within the interstices, as well as on the surface of the porous layer. There are two functions for the SnO$_2$ layer: to provide porous sites for the formation of iron and iron oxide particles, and to provide a highly conductive pathway for the iron oxide. The electroplated substrates were then thermally oxidized in 0.01 torr air at 700° C. for 3 minutes. An electrochemical capacitor was assembled according to example 3, CV measurement was conducted as well. C$_{el}$ of the electrode material was found to be 0.04 F/cm$^2$.

EXAMPLE 9

Figure 5:
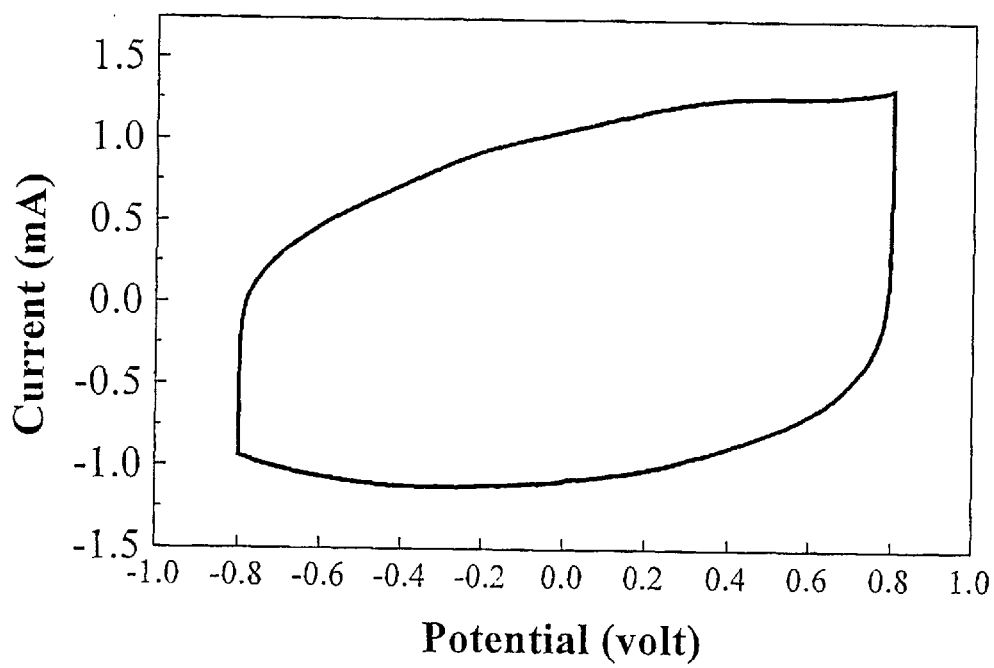
FIG. 5 is a cyclic voltammogram of electrodes consisting of a mixture layer of iron oxyhydroxide and oxide deposited on titanium substrates in 1M $Na_2SO_4$ aqueous solution under 20 mV/sec scanning rate.
Figure 6:
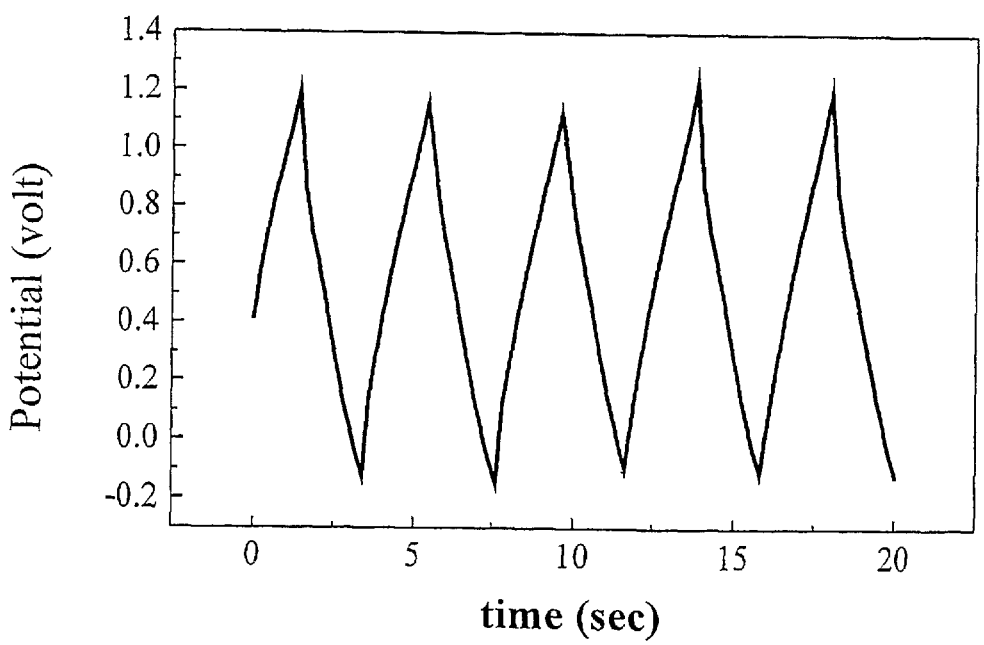
FIG. 6 is a constant-current charge-discharge plot of electrodes consisting of a mixture layer of iron oxyhydroxide and oxide deposited on titanium substrates in 1M $Na_2SO_4$ aqueous solution under a current density of 5 $mA/cm_2$.

Two SnO$_2$-coated titanium substrates prepared according to example 8 were immersed in 1M FeSO$_4$ aqueous solution at pH 8. A stream of oxygen gas was bubbled through the solution for 30 minutes to yield a composite layer of yellowish iron oxyhydroxide [FeO(OH)] and black iron oxide within the interstices, as well as on the surface of the porous $SnO_2$ layer. Using the iron-oxide electrodes as prepared, an electrochemical capacitor was assembled according to example 3, CV measurement was conducted and shown in FIG. 5. It is a quasi-rectangle CV loop indicating that the electrode materials have good kinetic reversibility and conductivity. $C_{el}$ of the electrode materials was found to be 0.04 $F/cm^2$. When the same cell was subjected to constant-current-density of 5 $mA/cm^2$ charging and discharging, it yielded linear potential-versus-time curves as shown in FIG. 6. Swift charge-discharge as seen is a typical character of capacitors. Both FIGS. 5 & 6 demonstrate that the present invention is full of commercial merits.

EXAMPLE 10

Figure 7:
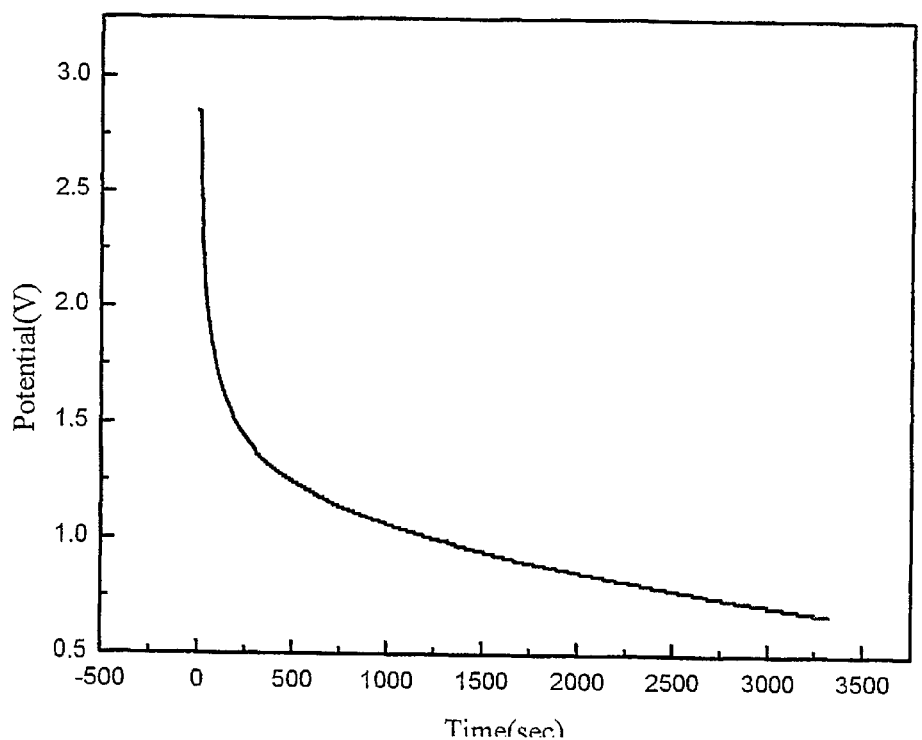
FIG. 7 is a self-discharge curve of a primitive supercapacitor containing two serially connected cells. Each cell consists of two pairs of 8 cm×8 cm $Fe_3O_4$/Fe electrodes connected in-parallel.
Figure 8:
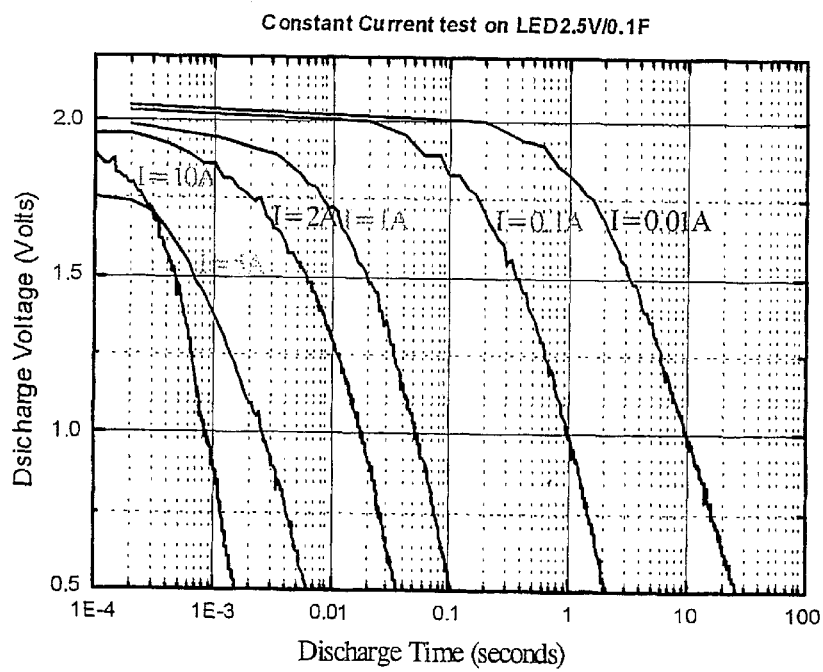
FIG. 8 is a group of discharge curves of a primitive supercapacitor using 8 cm×8 cm $Fe_3O_4$/Fe electrodes under various constant currents. The prototype device is rated as 2.5 V×0.1 F, and LED is the abbreviation of the assignee.

8 cm×8 cm $Fe_3O_4$/Fe electrodes were prepared according to example 1, and a unit cell was constructed simply by placing four pieces of electrodes in a regular plastic bag with a Manila paper disposed between every two electrodes. Without using spot or laser welding, the electrodes were clamped in parallel connection. After an aliquot of an aqueous solution containing 0.1M $Na_2SO_4$ and 0.5M KOH was put into the bag, it was sealed using a heat sealer. Neither additional encapsulation, nor compression was applied to the electrodes for intimate contact. Two loose unit-cells were connected in series to form primitive supercapacitors. Then, alligator clips were connected to the anode and cathode of supercapacitor for electrochemical and electrical characterizations. FIG. 7 shows a self-discharge curve of the primitive device after being charged to 2.8 volt. Initially the voltage of the device decreases very rapidly then levels off. Such behavior is commonly observed for regular capacitors as well as supercapacitors including commercial products. Nevertheless, the present invention shows a high self-discharge rate that is in accordance with many loose ends in the current cell-design. FIG. 8 contains the discharge curves of the fully charged device under various constant currents. Therefrom, the specifications of the prototype are extracted and listed in the following table:

| Maximum Working Voltage (V) | Capacitance (F) | ESR (mΩ) | Weight (g) | Dimensions (mm) |
| --- | --- | --- | --- | --- |
| 2.5 | 0.1 | 84.5 | 57.3 | 121 × 109 × 1.7 |

Despite the primitive construction of the device as described above, the present invention has demonstrated promising qualities for commercial use. Particularly, the prototype shows low ESR (equivalent series resistance) which is very important in high frequency and high power applications, and thin cell-thickness (1.7 mm) which is in compliance with the miniaturization of electronic devices. FIG. 8 also shows that the prototype is capable of delivering a peak current as high as 10A, and that is useful in applications requiring pulse powers.

Although preferred embodiments have been described to illustrate the present invention, it is apparent that changes and modifications in the described embodiments cab be carried out without departing from the scope of the invention intended to be limited only by the appended claims.

What is claimed is:

1. An electrochemical capacitor, comprising an electrode containing at least one material being a hydrated iron compound having a chemical composition of $Fe_xO_yH_z$, where $1.0 \leq x \leq 3.0$, $0.0 \leq y \leq 4.0$, and $0.0 \leq z \leq 1.0$, wherein said electrochemical capacitor is known as supercapacitor, ultracapacitor, or electric double layer capacitor.

2. The electrochemical capacitor of claim 1, wherein said $Fe_xO_yH_z$ is conductive and magnetic.

3. The electrochemical capacitor of claim 2, wherein said $Fe_xO_yH_z$ has a conductivity of no less than $10^{-2}$ Siemen/cm.

4. The electrochemical capacitor of claim 2, wherein said $Fe_xO_yH_z$ has a magnetic flux density of no less than 10 Gauss.

5. The electrochemical capacitor of claim 1, wherein said $Fe_xO_yH_z$ is directly grown on a conductive substrate which is first plated with a metallic iron.

6. The electrochemical capacitor of claim 1, wherein said $Fe_xO_yH_z$ is coated on a conductive substrate.

* * * * *